United States Patent
Merelli

(10) Patent No.: US 9,629,498 B2
(45) Date of Patent: Apr. 25, 2017

(54) COFFEE MACHINE FOR MEASURED CUP FILLING

(71) Applicant: NUOVA SIMONELLI S.P.A., Belforte del Chienti (IT)

(72) Inventor: Francesco Merelli, Pollenza (IT)

(73) Assignee: NUOVA SIMONELLI S.P.A., Belforte del Chienti (MC) (IT)

( * ) Notice: Subject to any disclaimer, the term of this patent is extended or adjusted under 35 U.S.C. 154(b) by 311 days.

(21) Appl. No.: 14/387,099

(22) PCT Filed: Feb. 7, 2014

(86) PCT No.: PCT/EP2014/052425
§ 371 (c)(1),
(2) Date: Sep. 22, 2014

(87) PCT Pub. No.: WO2015/051924
PCT Pub. Date: Apr. 16, 2015

(65) Prior Publication Data
US 2015/0359382 A1    Dec. 17, 2015

(30) Foreign Application Priority Data

Oct. 11, 2013 (IT) .............................. MC2013A0065

(51) Int. Cl.
| | |
|---|---|
| *A47J 31/00* | (2006.01) |
| *A47J 31/56* | (2006.01) |
| *A47J 31/36* | (2006.01) |
| *A47J 31/44* | (2006.01) |
| *A47J 31/52* | (2006.01) |
| *A47J 31/46* | (2006.01) |

(52) U.S. Cl.
CPC ........... *A47J 31/56* (2013.01); *A47J 31/3671* (2013.01); *A47J 31/4403* (2013.01); *A47J 31/46* (2013.01); *A47J 31/52* (2013.01)

(58) Field of Classification Search
CPC .. A47J 31/52; A47J 31/56; A47J 31/44; A47J 31/34; A47J 31/3671
USPC ............................... 99/280, 282, 283, 302 R
See application file for complete search history.

(56) References Cited

U.S. PATENT DOCUMENTS

| | | | | |
|---|---|---|---|---|
| 5,813,318 | A * | 9/1998 | Zanin .................... | A47J 31/007 99/291 |
| 6,164,189 | A * | 12/2000 | Anson .................... | A47J 31/56 222/146.5 |
| 2011/0097454 | A1 * | 4/2011 | Coccia .................... | A47J 31/36 426/231 |
| 2014/0137746 | A1 * | 5/2014 | Moran .................... | A47J 31/44 99/280 |

(Continued)

FOREIGN PATENT DOCUMENTS

| | | |
|---|---|---|
| DE | 102008014838 B3 | 9/2009 |
| DE | 102012200952 A1 | 7/2013 |

(Continued)

OTHER PUBLICATIONS

Search Report.

*Primary Examiner* — Reginald L Alexander
(74) *Attorney, Agent, or Firm* — Egbert Law Offices, PLLC

(57) ABSTRACT

A professional coffee machine for bars, adapted to provide for the measured filling of cups according to the specific preference of the customer for a normal, a short or a long coffee.

3 Claims, 2 Drawing Sheets

(56) References Cited

U.S. PATENT DOCUMENTS

2015/0013546 A1* 1/2015 Kastor ............... A47J 31/4428
99/300

FOREIGN PATENT DOCUMENTS

| EP | 1647951 A1 | 4/2006 |
|---|---|---|
| WO | 2012146641 A1 | 11/2012 |

* cited by examiner

COFFEE MACHINE FOR MEASURED CUP FILLING

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present patent application for industrial invention relates to a coffee machine of the type used in bars, which is adapted to provide for measured cup filling.

2. Description of Related Art Including Information Disclosed Under 37 CFR 1.97 and 37 CFR 1.98.

The peculiarities and advantages of the invention will become evident after a short description of the prior art with relevant drawbacks.

First of all, a general description of the structure and operation of a coffee machine is given below.

Such a machine is provided with an inlet for water from the water system and with a series of pipes used to take the water through suitable heating elements, and pour pressurized water inside the filter-holders that are suitably preloaded with pressed coffee powder and provided in lower position with one or two coffee dispenser nozzles.

The passage of the hot water through the layer of coffee powder produces the desired beverage, basically in emulsion state, and its fall by gravity inside the cups disposed under said dispenser nozzles.

Starting from such a technology, it must be considered that the taste of espresso bar drinkers can be very different: some customers do not indicate any particular preference, but many of them make a precise request, asking for a "short" (strong) or "long" (weak) coffee.

In most cases, in order to satisfy the different requests from customers, the operator visually checks the level reached by the coffee in each cup in real time and stops distribution when he believes that the coffee has reached a medium level (for a "normal" espresso), a minimum level (for a "short" espresso) or a maximum level (for a "long" espresso).

More precisely, in order to stop the distribution of coffee, the operator actuates the stop command of the pump used to provide the hot water flow towards the filter-holder.

Evidently, such an operation is very approximate and surely not capable of ensuring the uniform filling of the cups used to make and serve a "short" or a "long" coffee.

In order to make the task of the operator easier and less empirical, professional coffee machines are equipped with an automatic device that is able to guarantee the constant filling level of the cups by suitably cooperating with the electronic control unit provided in the coffee machine.

Practically speaking, the device is a volumetric flow meter mounted along the water conduit that takes the hot water towards the dispenser unit of the coffee machine.

Moreover, according to the customer's request, the electronic control unit is programmed with the information about the amount of water that is necessary to obtain a "normal", a "short" or a "long" coffee.

Because of the cooperation with said flow meter, the electronic control unit is informed in real time about the actual amount of hot water that is flowing towards the dispenser unit of the coffee machine.

In view of the above, the electronic unit can interrupt the hot water flow as soon as it is informed about the passage of the correct amount of water (which has been previously set in the electronic unit) for the specific customer's request for a "normal", a "short" or a "long" coffee.

Because of this operating principle, a coffee machine should guarantee the standardized constant filling level for every "short", "normal" or "long" coffee distributed during its operation.

In practice, nevertheless, such an operating principle has proved to be unsatisfactory.

In fact, although it is true that the volumetric flow meter exactly evaluates the amount of hot water that reaches each filter-holder, it is also true that it cannot control the variables that affect the way in which each hot water dose actually interferes with the coffee powder contained in the filter-holder.

Being installed upstream the filter-holder, the volumetric measuring device cannot consider two parameters that variably affect the amount of coffee actually distributed for each cup.

First of all, reference is made to the water dispersion that occurs in the section of the water circuit comprised between the measuring device and the filter-holder, and secondly to the compression level and/or granulometry of the coffee powder inside the filter-holder (which certainly affect the amount of water that can reach the dispenser nozzles of the filter-holder, after passing through the layer of pressed coffee powder).

In view of the above, it is impossible to say with certainty that all "short" coffees will reach the same level in the cups, in spite of starting from the same amount of hot water detected by the volumetric flow meter.

The evaluation of such a drawback has led to the additional evolution of the prior art—disclosed in patent WO2012146641—that has finally assured that each coffee cup used to produce a "short" coffee is exactly filed with the same amount of coffee loaded in all other cups used to produce a "short" coffee, either before or after.

In particular, the invention claimed in the aforementioned prior document provides for a typical professional coffee machine equipped with a weighing device, actually a load cell, applied to the horizontal tray used to support the cups to be filled under the filter-holders.

By means of a suitable electronic control unit, cooperation is obtained between said load cell and the devices used to send hot water towards each filter-holder and enable the distribution of coffee.

Such cooperation guarantees that the electronic control unit is able to precisely indicate the time when the distribution of coffee must be interrupted.

In particular, such an indication is given as soon as, in view of the cooperation with said load cell, the control unit is informed that each cup has reached the same weight, net of tare, as a predefined amount of coffee (i.e. beverage) that corresponds to a "normal", a "short" or a "long" coffee, respectively.

In any case, the fact that said load cell detects the amount of coffee downstream the filter-holders avoids the risk that the value detected from time to time (in terms of distributed coffee) is negatively affected—as in the prior art—by dispersions along the water conduit of the coffee machine or by the higher or lower absorption of water by the coffee powder pressed inside the filter-holders.

However, it must be noted that even the latest technology has shown a functional limitation that prevents the use of such a technology in the professional coffee machines used in bars.

Such a functional limitation derives from the position of said load cell directly under the grille where the cups are positioned to receive the coffee that drips from the filter-holders.

However, because of its position under the filter-holders, such a grille usually receives by gravity the residues of the coffee powder loaded in the filter-holders, as well as the coffee drippings that come out from the filter-holders also after removing and serving the cups.

Considering that the grille is characterized by the presence of numerous slots, it is easy to understand that the solid and liquid residues poured on the grille inevitably get said load cell dirty and clogged, thus altering its correct operation mode.

BRIEF SUMMARY OF THE INVENTION

The specific purpose of the present invention is to devise a coffee machine that, while using a load cell according to the operating principle of the prior art, provides for positioning the load cell in such manner to keep it free of the solid and liquid coffee residues in order not to alter its operation mode.

In particular, such a result has been obtained by positioning the load cell directly inside the body of the coffee machine, and no longer under the grilled surface that supports the cups, while guaranteeing that the load cell can still detect in real time the weight of the cups that are positioned on the grilled surface.

BRIEF DESCRIPTION OF THE SEVERAL VIEWS OF THE DRAWINGS

For explanatory reasons the description of the invention continues with reference to the attached drawing, which only has an illustrative, not limiting value, wherein.

DETAILED DESCRIPTION OF THE INVENTION

Figure 1:
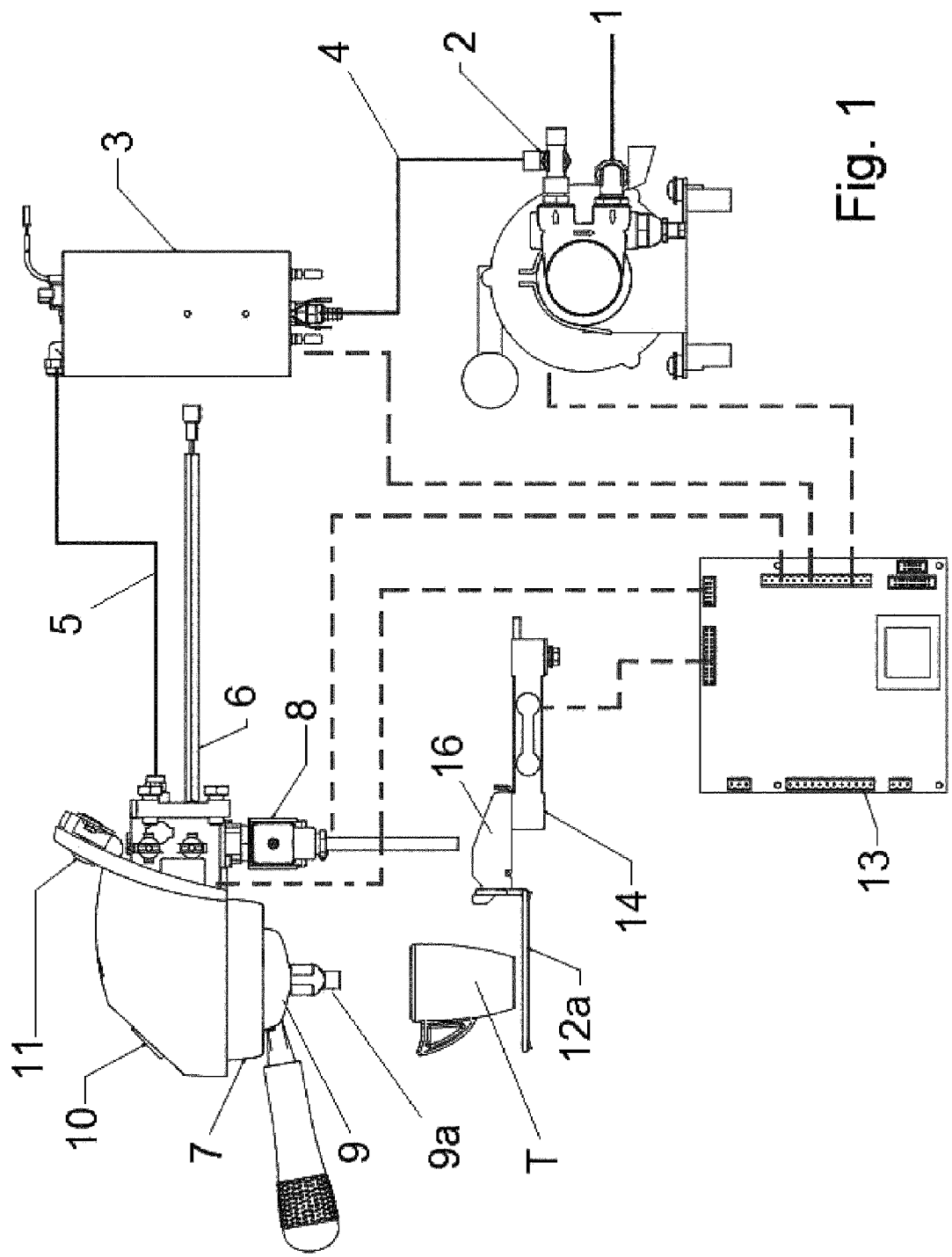
FIG. 1 is a diagrammatic view of the configuration of the new coffee machine of the invention.

Referring to said figure, the machine of the invention is traditionally provided with:
an inlet for water from the water system (1)
a pump (2) used to convey the water towards a boiler (3) by means of a first water conduit (4)
a second water conduit (5) along which a heating element (6) operates, used to take the hot water towards a coffee dispenser unit (7)
an electrovalve (8) disposed at the end of said second water conduit (5) basically at the entrance of said coffee dispenser unit (7)
one or more filter-holders (9) with dispenser nozzles (9a) operating in said coffee dispenser unit (7)
a control panel (10) with a display (11)
a horizontal supporting surface (12), preferably with grilled configuration, disposed under said dispenser nozzles (9a) in order to support the cups (T) to be filled.

Within such a traditional structure, an electronic control unit (13) is provided and suitably interfaced with:
said pump (2)
said boiler (3)
said electrovalve (8)
said control panel (10).

According to the commands entered by the operator on the control panel (10), the electronic control unit (13) can start or stop the pump (2), set the heating level of the boiler (3), as well as open or close the electrovalve (8).

For a better understanding of the enclosed figure, a broken line is used to represent the electrical connections between the traditional and innovative parts of the coffee machine of the invention.

Moreover, according to the new machine of the invention, the grilled tray (12) is provided with independent suspended portions (12a), each of them directly disposed under one of said filter-holders (9) in order to support the cups to be filled.

Each suspended portion (12a) is associated with an electronic load cell (14) used to detect the weight of the cup disposed on the suspended portion (12a) also to instantaneously check the filling level; it being also provided that the load cell (14) is interfaced with said electronic control unit (13).

Moreover, it must be noted that the electronic control unit (13) is programmed with the net weight of the amount of coffee that is necessary to respectively obtain a "normal", a "short" and a "long" coffee in the cup.

The control panel (10) is provided with a command used by the operator of the coffee machine of the invention to "set" the specific type of coffee asked by the customer on the electronic control unit (13) and consequently the specific amount of coffee to be dispensed in each filter holder (9).

Therefore, when a cup is positioned on one of said suspended portions (12a) of the supporting surface (12), the load cell (14) sends the information on the weight of the cup (T) to the electronic control unit (13) that acquires it as tare.

Now the operator can send the traditional command used to distribute coffee to the coffee machine of the invention in order to operate the pump (2) and convey pressurized hot water along the water conduit that feeds the filter-holders (9) and, at the same time, open the electrovalve (8) disposed along the water conduit.

In this way the cup (T) starts getting filled with the coffee distributed by the filter-holder (9), thus progressively increasing its weight on said load cell (14).

Considering that the load cell (14) is interfaced with the electronic control unit (13), it is easy to understand that the electronic control unit (13) receives in real time the information on the progressive weight increase recorded by the cup during filling.

In view of the above, by using the initial tare value of the cup (T) and the calculation algorithm contained in the electronic control unit (13), the electronic control unit (13) can exactly detect the time when the net weight of the coffee poured in the cup has reached a value that corresponds to the set value according to the specific type of coffee requested by the customer (i.e. "normal", "short" or "long").

In view of such a piece of information, the electronic control unit (13) instantaneously sends the stop command to the parts used to distribute coffee from the filter-holder (9).

Reference is made to the command used to deactivate the pump (2) that feeds the water circuit towards the filter-holder (9), as well as to the command used to close the electrovalve (8) installed along the water circuit.

It must be noted that the coffee machine of the invention (and more precisely the distribution of coffee) can be manually stopped by pushing a stop button provided on the control panel (10) when the operator reads the information about the correct filling of the each cup on the display (11) activated by the electronic control unit (13).

Finally, it must be noted that the electronic control unit (13) can be also devised in such a way to operate according to a "self-learning" mode.

In such a case, it would no longer be necessary to set the electronic control unit (13) with the exact weight of the coffee to be poured the cup (T) before stopping the distribution of coffee.

Instead, it would be necessary to manually stop the coffee distribution for the first cup as soon as the operator has visually verified that the desired level has been reached according to the type of coffee in preparation (normal, long or short).

In this way, the electronic control unit (13) can save the initial value and use it every time it is necessary to distribute a specific amount of coffee that corresponds to a "normal", "long" or "short" coffee, respectively.

Within such an operating principle, the authentic peculiarity of the present invention resides in the special modes provided for the positioning of the load cells (14) associated with said suspended portions (12a) of the supporting surface (12).

Figure 2:
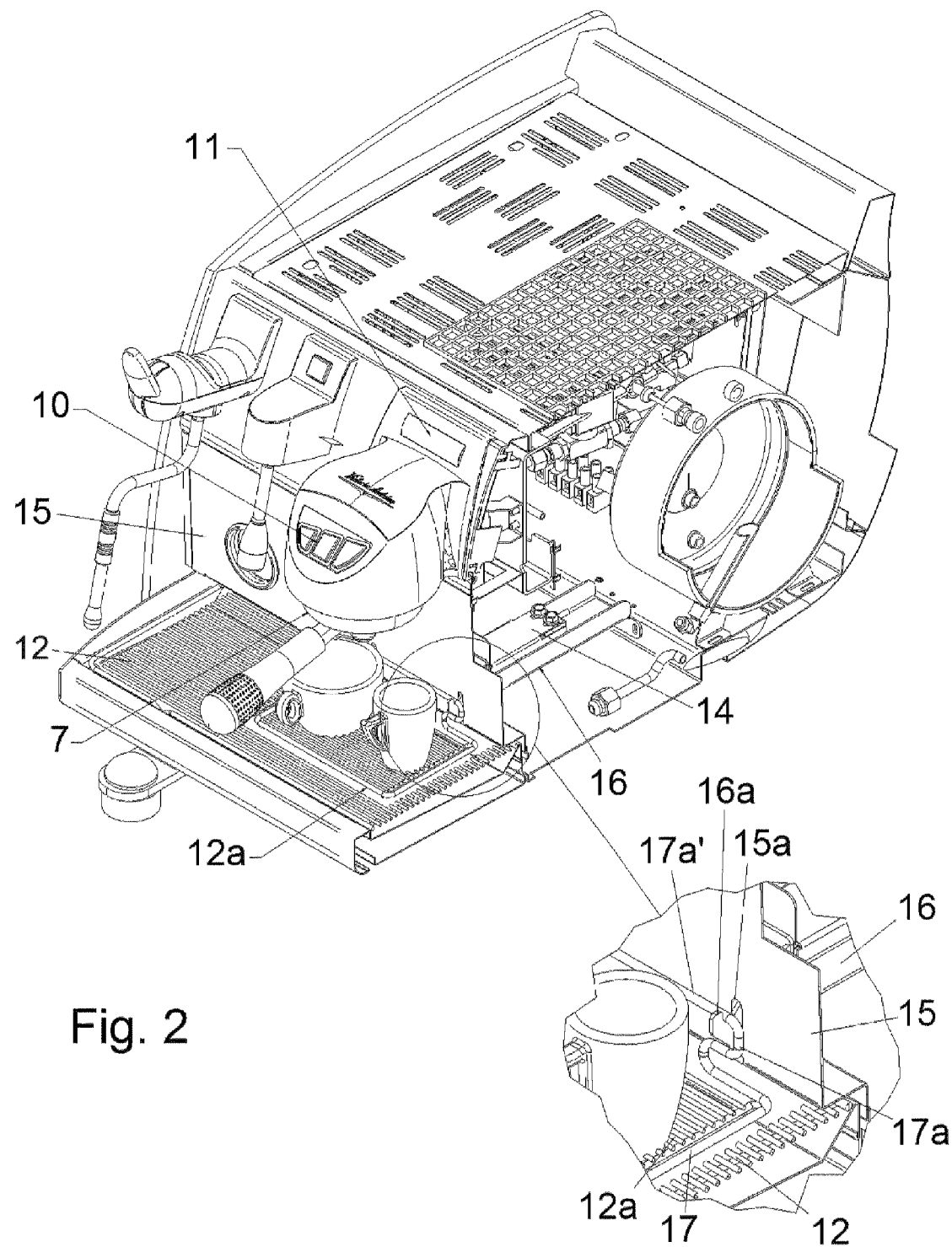
FIG. 2 is a partial axonometric view of the same machine with an enlarged view of a detail.

As shown in FIG. 2, each load cell (14) is contained in the body of the coffee machine of the invention and in any case in internal position on the front vertical wall (15) from which both the dispenser unit (7) with the filter-holders (9) and the supporting surface (12) for the cups protrude.

In order to provide the desired interaction between each load cell (14) and the corresponding suspended portion (12a) of the supporting surface (12), each of said portions (12a) is fixed to one or more load shelves (16) directly interfaced with the corresponding load cell (14) so that the latter can actually verify the weight changes recorded onto said suspended portion (12a) during the progressive filling of the cups.

Moreover, as shown in FIG. 2, each of said one or more load shelves (16) is inserted through a corresponding through slot (15a) suitably obtained towards the base of the front wall (15) of the coffee machine of the invention.

According to the preferred embodiment shown in FIG. 2, each of said suspended portions (12a), which is provided with a rectangular surface, is surrounded by a frame (17) made of metal wire; it being provided that said frame (17) is also provided, in correspondence of the rear longitudinal edge of the suspended portion (12a), with a vertical section configured as a grilled edge (17a).

The upper longitudinal profile (17a') of said grilled edge (17a) can be hung to the hooked ends (16a) of the shelves (16) associated with the load cell (14), as shown in the enlarged detail of FIG. 2.

This is extremely practical because it allows for easy and quick mounting and dismounting of each suspended portion (12a) from the shelves (16) in order to clean the supporting surface (12).

The invention claimed is:

1. A coffee machine comprising:
    a front wall;
    an inlet adapted to deliver water from a water supply;
    a boiler;
    a first water conduit communicating with said boiler;
    a pump cooperative with a first water conduit so as to convey the water towards said boiler;
    a coffee dispenser unit;
    a second water conduit having a heating element, said second water conduit connected to said coffee dispenser unit, said second water conduit adapted to pass hot water toward said coffee dispenser unit;
    and electrovalve disposed at an end of said second water conduit;
    at least one filter holder with dispenser nozzle positioned in said coffee dispenser unit;
    a control panel having a display, said control panel having a button that is adapted to stop a distribution of coffee;
    a horizontal supporting surface having at least one suspended portion used to detect a weight of a cup disposed under the filter holder, said at least one suspended portion having load cells, each of said load cells being housed behind said front wall, each of said load cells having at least one load shelf joined to said at least one suspended portion, said at least one load shelf passing through a hole in said front wall, said at least one load shelf having a hooked end externally positioned on said front wall, said hooked end adapted to removably support an upper longitudinal section of a grilled edge of said at least one suspended portion; and
    and electric control unit cooperative with said pump, said boiler, said electrovalve, said control panel and said load cells.

2. The coffee machine of claim 1, wherein said electronic control unit is adapted to save one or more predefined weight data and compare the predefined weight data with weight data measured by and coming from each of said load cells as well as to stop an operation of said pump and to close said electrovalve when said control unit has verified a correspondence between each of said one or more predefined weight data and weight datum coming from the load cells.

3. The coffee machine of claim 1, wherein said electronic control unit is adapted to save one or more predefined weight data and compare the predefined weight data with weight data measured by and coming from each of said load cells, as well as to show on the display a manual stop command of the machine as soon as said control unit has verified a correspondence between each of said one or more predefined weight data and weight datum coming from the load cells.

* * * * *